UNITED STATES PATENT OFFICE.

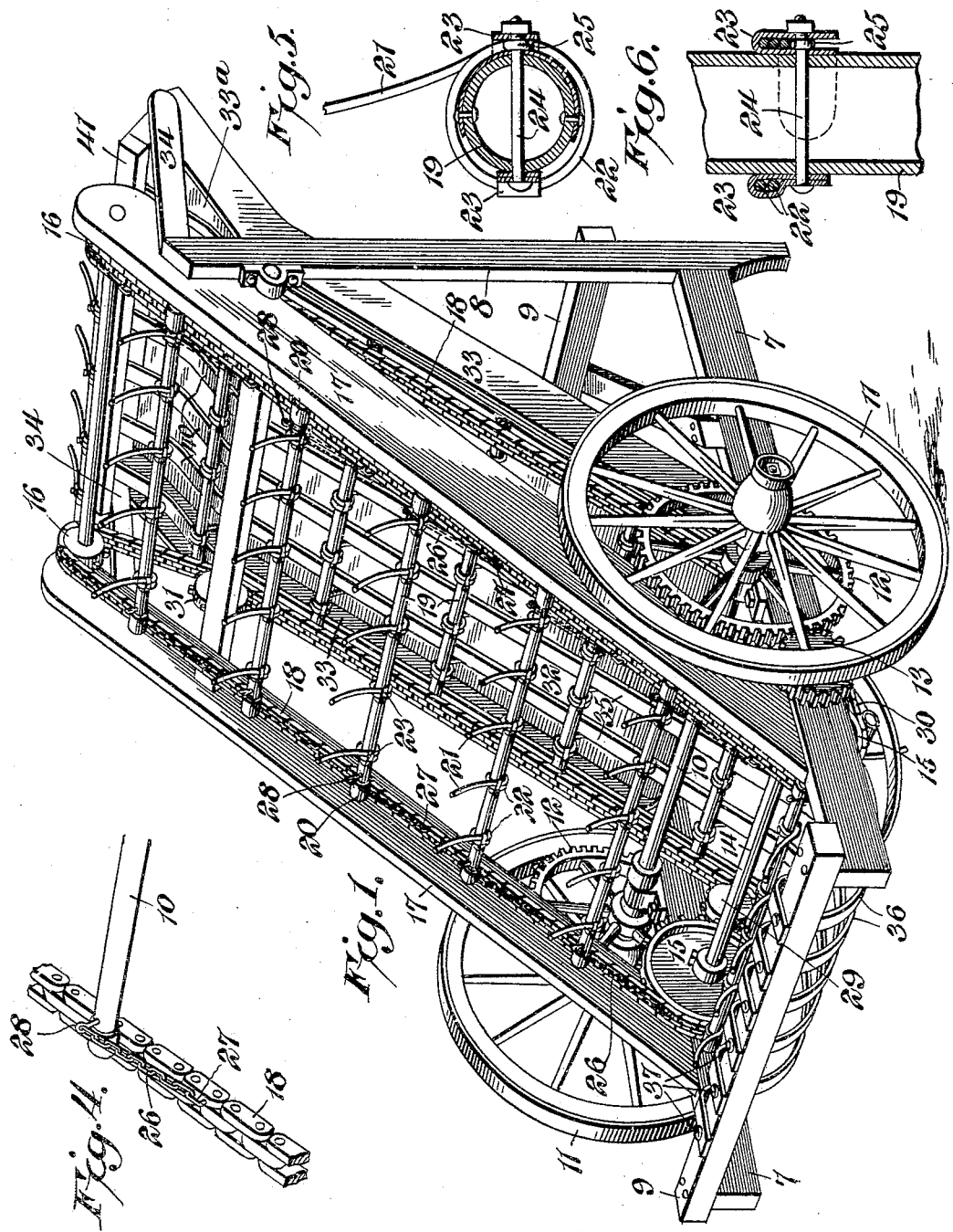

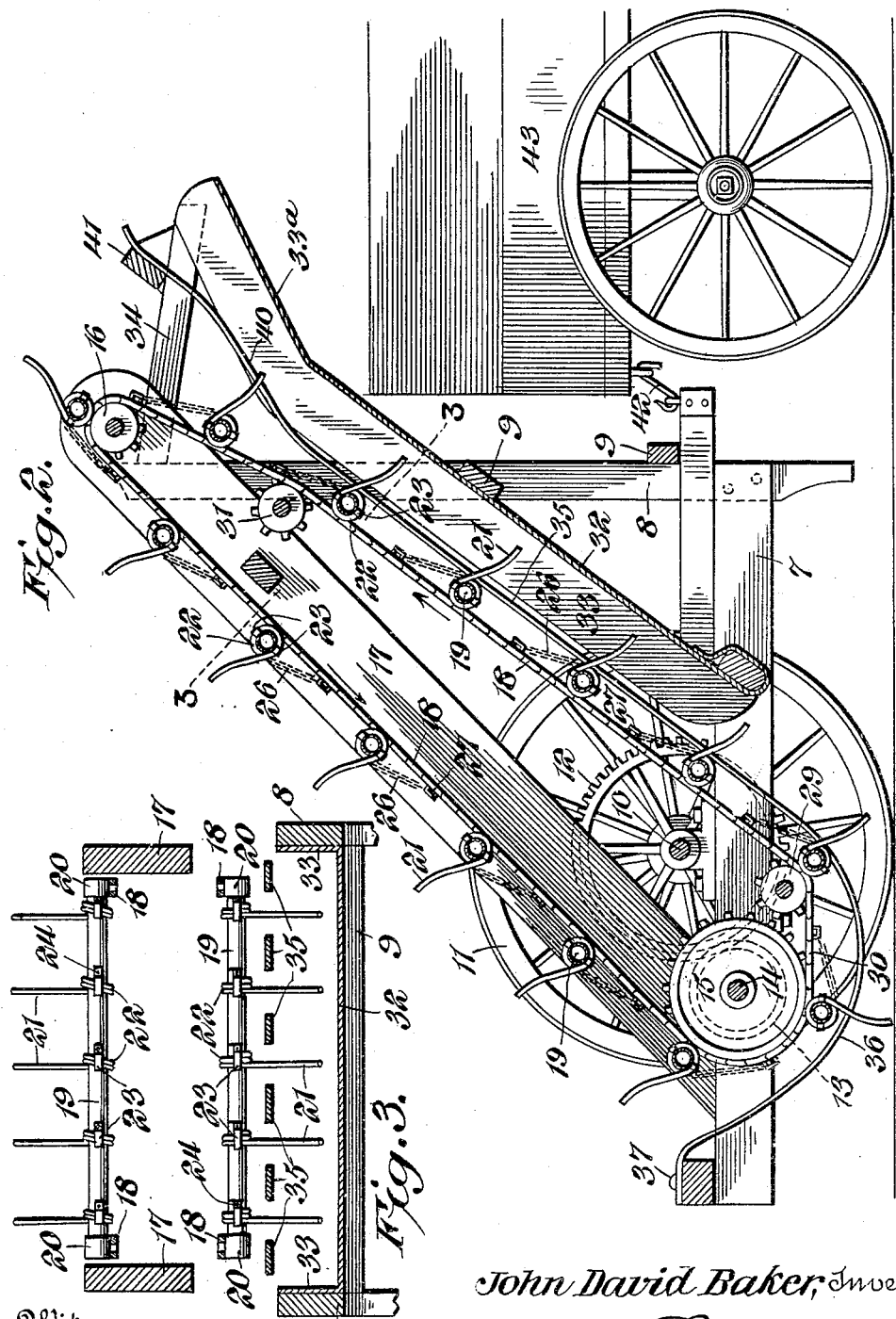

JOHN DAVID BAKER, OF LISBON, OHIO, ASSIGNOR OF ONE-HALF TO ALPHEUS ARTER, OF LISBON, OHIO.

HAY-LOADER.

No. 930,119.   Specification of Letters Patent.   Patented Aug. 3, 1909.

Application filed June 27, 1908. Serial No. 440,644.

*To all whom it may concern:*

Be it known that I, JOHN DAVID BAKER, a citizen of the United States, residing at Lisbon, in the county of Columbiana and State of Ohio, have invented a new and useful Hay-Loader, of which the following is a specification.

The present invention relates to means for loading hay or other material of an analogous nature on the wagons as the same are drawn over the field, and the primary object of this invention is to provide a novel and simple structure, which can be readily attached to the rear of a vehicle, and will effectively pick up all the hay or other material in its path of movement and elevate it into said vehicle.

Another and important object is to provide means, which will not become clogged or choked in operation, and will deliver the material to a comparatively high point in order that a maximum load can be placed on the wagon.

The preferred embodiment of the invention is illustrated in the accompanying drawings, wherein:—

Figure 1 is a perspective view of the hay loader. Fig. 2 is a longitudinal sectional view therethrough, showing the same attached to the rear end of a wagon. Fig. 3 is a sectional view on the line 3—3 of Fig. 2. Fig. 4 is a detail perspective view, illustrating one of the brace connections between a carrier chain and cross bar of the endless rake. Fig. 5 is a detail sectional view on an enlarged scale through one of the cross bars to illustrate the holding means therefor. Fig. 6 is a detail sectional view at right angles to Fig. 5.

Similar reference numerals designate corresponding parts in all the figures of the drawings.

In the embodiment illustrated, a frame is employed, comprising base pieces 7 and standards 8 connected by cross bars 9. An axle 10 is employed having ground wheels 11 to which are fastened gears 12 meshing with pinions 13 on a driving shaft 14 that is located in the lower portion of the frame. Lower sprocket wheels 15 are fixed to the shaft 14, and upper sprocket wheels 16 are mounted on the upper ends of side bars 17 that constitute in effect parts of the supporting frame.

An endless rake is employed, comprising carrier chains 18, which pass about the lower and upper sprocket wheels, and are connected by cross bars 19 secured to the outer sides of the chains, as shown at 20. Fastened to the cross bars, are teeth 21 having their inner portions coiled, as shown at 22 around said cross bars. A pair of loops 23 are employed for the coil of each tooth, said loops surrounding the coils on opposite sides of the cross bars, and being secured by a common bolt 24 that passes through the cross bar and also through a terminal eye 25 formed at the end of the coil. These loops prevent the lateral play of the teeth, but do not prevent their back and forth yielding movements. In order to prevent the cross bars 19 turning when their movement is resisted by the material on which they act, brace chains 26 are employed fastened as shown at 27 to the carrier chains in advance of the cross bars, and secured as illustrated at 28 to the outer sides of the cross bars.

It will be noted, particularly by reference to Fig. 2 that by this structure, the advance run of the rake has an ascending movement when the loader is moved forwardly, and that this run inclines forwardly and upwardly. A lower set of idlers 29 is disposed in advance of the lower sprocket wheels 15, forming a substantially horizontal run 30 to the rake. Other idlers 31 are located a short distance below and in rear of the upper sprocket wheels 16, these idlers 31 being so disposed that they will cause the upwardly ascending run of the rake to have angularly disposed portions.

Arranged beneath and in advance of the ascending run of the endless rake is directing means in the form of an imperforate trough having a bottom 32 and side walls 33, the bottom having its lower end extended and looped around one of the cross bars 9 of the supporting frame. This trough is disposed substantially parallel to the lower portion of the ascending run of the rake, and its upper portion 33ª is forwardly offset to form a delivery spout. This end is supported by suitable bracket arms 34. Interposed between the ascending run and the trough are a series of spaced clearer bars 35, between which the teeth of the rake operate. The lower portions of these bars are curved, as shown at 36 beneath the idlers 29 and sprocket wheels 15, and have their adjacent ends fastened, as shown at 37 upon the rear cross bar 9 of the frame. The upper portions 40 of the clearer bars are forwardly offset, beginning substantially at the idlers 31, and then curve upwardly, being fastened to a cross bar 41 secured to the bracket arms 34. The main portions of the clearer bars are disposed parallel to the main portion of the ascending run of the rake and to the main portion of the directing trough. Said trough and bars thus define between them a hay or material passage, which is slightly contracted at the offset to provide a narrow throat and then expands to form an enlarged delivery mouth.

In use, the front portion of the supporting frame is fastened by a link 42 to the rear end of a wagon 43, and consequently as said wagon is drawn over the field, the loader will trail behind it. The rake will consequently be moved and the teeth moving forward over the ground, will gather the hay or other material and elevate it in the trough 32. After said teeth pass the upper idlers 31, they are gradually withdrawn from the passage, because of the divergent arrangement of said passage and the upper portion of the run of the rake. It will be observed that this is done before the teeth begin to reverse for their downward movements. The trough being imperforate, there is nothing to catch the material and cause it to clog, and the flared mouth insures the free delivery of said material into the vehicle. This mouth moreover being at a considerable height, insures a maximum load. The structure of the parts furthermore is advantageous. By means of the chain braces, the cross bars of the rake are held against turning, and consequently the yielding action comes entirely upon the spring teeth. Furthermore while these teeth can move rearwardly and forwardly, their lateral movement is prevented by the loops surrounding the coils, and consequently said teeth are held from engagement with the clearer bars or slats.

The sets of teeth of the endless rake are spaced apart a distance approximately equal to the length of the horizontal run 30 of the rake, so that only one set of teeth will be acting at any time in gathering the hay from the ground, and as the lower end of the trough 32 is open and spaced above the ground higher than the horizontal run, the hay will be gathered in a mass immediately under the trough so that the ascending teeth can carry the hay upwardly therethrough. As the teeth engaged in gathering the hay are moved forwardly by the combined action of the rake and loader itself, a large mass of hay is gathered by each set of teeth, and to accommodate this large mass of hay, the lower end of the trough is terminated a suitable distance above the ground, thus preventing choking or forming the hay into a tight wad preparatory to its being drawn into the trough.

From the foregoing, it is thought that the construction, operation and many advantages of the herein described invention will be apparent to those skilled in the art without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In a hay loader, the combination with an endless rake having an ascending run, of clearer bars disposed in advance of said run, said run and the clearer bars being substantially parallel from the lower end thereof to a point below but adjacent to the upper turn of the rake and from that point being deflected in opposite directions and at opposite sides of a straight line extending between the parallel portions of the run and clearer bars to cause the rake teeth to be withdrawn from between the clearer bars before the upper turn of the rake is reached.

2. In a traveling hay loader, the combination of an endless rake, a clearer frame, and a directing device disposed substantially parallel therewith and coöperating with the frame to form a hay passage having a flared upper end and a constricted throat below the flared upper end, the remaining portion of the passage being straight from the throat to the lower end and of substantially the same cross-sectional area at all points, and means for supporting the rake in a position that the teeth thereof will be withdrawn immediately at the throat after passing through the straight portion of the passage and without passing into the upper flared end of the latter.

3. In a hay loader, the combination with a series of clearer bars, of an endless rake having a horizontal run at its lower end, and an upwardly extending run, the upper end portion of which recedes from the clearer bars at a point before the upper turn of the rake is reached.

4. In a hay loader, the combination with an upwardly and forwardly inclined rake frame, of pulleys located at the opposite ends thereof, idlers located in advance of the lower pulleys, and other idlers located below and in rear of a vertical plane passing through the upper pulleys, an endless rake passing around the pulleys and idlers and having a horizontal run at its lower end, and an ascending run rising from the horizontal run, the upper end portion of the ascending run being disposed at an angle to the lower portion of said run and extending directly to the uppermost set of pulleys, and an upwardly inclined hay passage to which the hay is delivered by the rake and through which said hay is carried by said rake.

5. In a hay loader, the combination with an endless rake having a run disposed substantially parallel with the ground over which the loader travels and having an ascending run rising from the horizontal run, the adjacent sets of teeth of the rake being spaced apart a distance approximately equal to the length of the horizontal run, of clearer bars between which the rake teeth move, said clearer bars being deflected away from the ascending run of the rake only at a point below and adjacent to the upper end of said run to facilitate the withdrawal of the rake teeth, and said clearer bars being extended beyond the upper end of the rake, the upper extremities thereof being deflected upward.

6. In a hay loader, the combination with a base frame, of an upwardly and forwardly inclined endless rake carried thereby, clearer means and directing means located in front of the rake to define a passage through which the hay is carried upwardly by the rake teeth, certain of said means having portions deflected toward the other means to constrict the hay passage at the upper end of the rake.

7. In a hay loader, the combination with an upwardly and forwardly inclined endless rake, of clearer means and directing means located in front of the rake to define an intermediate passage through which the hay is carried upwardly by the rake teeth, the clearer means being deflected toward the directing means to constrict the hay passage at a point below its upper end, and the upper ends of said clearer and directing means extended beyond the rake, these extended portions diverging from each other to flare the upper end of the hay passage.

8. In a hay loader, the combination with an endless rake having a horizontal run adjacent the ground and an ascending run rising from the forward end of the horizontal run, of directing and clearer means associated with the run and defining a material passage in which the rake teeth operate, the upper portions of said means being both deflected away from the ascending run to provide an offset discharge spout, the lower portions of the directing and clearer means, respectively, terminating above and extending under the horizontal run.

9. In a hay loader, the combination with an endless rake having a forwardly inclined ascending run, of an idler located between the ends of the run and forming the same into upper and lower angularly disposed portions, the upper portion of said run extending upward at a greater angle than the lower portion thereof below said idler, and directing and clearer means associated with the run and defining a material passage between them in which the teeth of the rake operate, the upper portions of said means, beginning adjacent to the idler, being deflected away from the ascending run to provide an offset discharge spout.

10. In a hay loader, the combination of an endless rake having an upwardly and forwardly inclined ascending run, an upwardly and forwardly inclined directing trough disposed in front of the said ascending run and substantially parallel therewith through a greater portion of its length, said trough having two portions disposed at an angle to each other, and clearer bars disposed between the rake and trough and having intermediate portions adjacent the upper extremities bent toward the angle between the said angularly-disposed portions of the trough for forming a constricted throat between the bars and trough, the upper extremities of the bars being outwardly diverged to form with the trough an outwardly flared discharge spout.

11. In a hay loader, the combination with a rake including endless carriers, cross bars secured to one face of the same, and teeth carried by the cross bars, of brace connections extending from the cross bars to a point on the carriers in advance of said cross bars and adapted to prevent the cross bars turning under load, each brace connection being flexible at points between its ends.

12. In a hay loader, the combination with a rake including endless carrier chains, cross bars secured to the outer sides of the same, brace chains connected to the ends of the cross bars and to the carrier chains and teeth mounted on the cross bars, of material directing means associated with the rake.

13. In a hay loader, the combination with an endless rake including cross bars, spring teeth coiled about the cross bars and loops surrounding the coiled portions of the teeth to prevent their lateral movement, of clearer bars between which the teeth operate, said teeth being held against engagement with the bars by the loops.

14. In a hay loader, the combination with an endless rake including cross bars, spring teeth coiled about the cross bars, loops surrounding the coiled portions of the teeth on opposite sides of each bar and a single bolt for holding the loops and engaging the end of each tooth, of clearer bars between which the teeth operate.

15. In a hay loader, the combination with a supporting frame, of an endless rake mounted thereon and having a forwardly inclined ascending run, an idler engaged with the run between the ends thereof to cause a change in direction in said run, the portion of said run above said idler being at a greater angle to the horizontal than the portion below the idler, a directing trough located in advance of the ascending run, and having an outwardly and forwardly deflected upper end portion forming a delivery spout, and longitudinally disposed clearer bars arranged over the trough and spaced apart to permit the teeth of the rake to operate between them, the upper ends of said bars being outwardly and forwardly deflected over the deflected upper end of the trough and then extended in angular relation to said deflected end to provide a flared mouth.

16. In a hay loader, the combination with an endless rake having an ascending run, of a guide trough located in advance and longitudinally of the ascending run, said trough having an imperforate bottom and upwardly extending side walls between which the rake teeth operate, and spaced clearer bars located longitudinally above the upper edges of the side walls and over the open side of the trough, the lower end of the trough being open and disposed above the lower end of the said ascending run, teeth on the rake extending between the clearer bars, said trough being forwardly deflected at a point substantially in a vertical line beneath the upper turn of the rake run and from this point extended out beyond said run to form a delivery spout, and the bars having their intermediate portions adjacent their upper extremities bowed toward the bottom of the trough at the point of deflection thereof to form a constricted throat.

17. In a hay loader, the combination with an endless rake having an ascending run, of a guide trough located in advance and longitudinally of the ascending run, said trough having an imperforate bottom and upwardly extending side walls between which the rake teeth operate, and spaced clearer bars located longitudinally above the upper edges of the said walls and over the open side of the trough, said clearer bars extending from the upper end of the trough down to and around the lower end of the run, and teeth on the rake extending through between said clearer bars, said trough being forwardly deflected at a point substantially in a vertical line beneath the upper turn of the rake run and extended out beyond the said run to form a delivery spout, said trough having an uninterrupted bottom from one extremity to the other, the portion of the bars adjacent their upper extremities being bowed and arranged with their convex sides opposed to the trough at the point of deflection thereof to form a constricted throat at the inner end of the spout.

18. In a hay loader, the combination with an endless rake having a horizontal run and an ascending run, of a guide trough supported in advance and longitudinally of the ascending run, and with its lower end above the lower end of the run and at a greater distance from the ground than the horizontal run, said trough having an imperforate bottom and upwardly extending side walls between which the rake teeth operate, and spaced clearer bars located longitudinally above the upper edges of the side walls over the open side of the trough, said clearer bars extending below the lower edge of the trough downward to the horizontal run and rearwardly and upwardly therefrom, said trough being forwardly deflected at its upper end to form a delivery spout and said bars being bent toward the bottom of the trough at the point of deflection thereof to form a constricted throat.

19. In a hay loader, the combination with an endless rake having an ascending run, the upper end of this run being of a greater inclination than the lower portion thereof, of a guide trough located in advance and longitudinally of the ascending run, said trough having an imperforate bottom and upwardly extending side walls between which the rake teeth operate, and spaced clearer bars located longitudinally above the upper edges of the side walls and over the open side of the trough, and teeth on the rake extending through between the clearer bars, said trough being forwardly deflected at a point in advance of the upward deflection of the rake run, and said clearer bars being also outwardly deflected at this point and then being upwardly deflected to form a discharge mouth at the end of the trough, the points of deflection of the trough and bars being disposed in an approximately horizontal line passing through the point of deflection of the rake and located below the upper end thereof.

In testimony, that I claim the foregoing as my own, I have hereto affixed my signature in the presence of two witnesses.

JOHN DAVID BAKER.

Witnesses:
W. S. POTTS,
H. R. MCDONALD.